(12) United States Patent
Melanson et al.

(10) Patent No.: US 8,553,430 B2
(45) Date of Patent: Oct. 8, 2013

(54) RESONANT SWITCHING POWER CONVERTER WITH ADAPTIVE DEAD TIME CONTROL

(75) Inventors: John L. Melanson, Austin, TX (US); Mauro L. Gaetano, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 534 days.

(21) Appl. No.: 12/340,185

(22) Filed: Dec. 19, 2008

(65) Prior Publication Data

US 2010/0020569 A1    Jan. 28, 2010

Related U.S. Application Data

(60) Provisional application No. 61/083,717, filed on Jul. 25, 2008.

(51) Int. Cl.
*H02M 3/335* (2006.01)

(52) U.S. Cl.
USPC .......................................... 363/21.03; 363/97

(58) Field of Classification Search
USPC .................... 363/21.02, 21.03, 21.11, 41, 95, 363/97
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |

(Continued)

FOREIGN PATENT DOCUMENTS

| | | |
|---|---|---|
| DE | 19713814 | 10/1998 |
| EP | 0632679 | 1/1995 |

(Continued)

OTHER PUBLICATIONS

AN-H52 Application Note: "HV9931 Unity Power Factor LED Lamp Driver" Mar. 7, 2007, Supertex Inc., Sunnyvale, CA, USA.

(Continued)

*Primary Examiner* — Adolf Berhane
*Assistant Examiner* — Yemane Mehari
(74) *Attorney, Agent, or Firm* — Andrew Mitch Harris; Mitch Harris, Atty at Law

(57) ABSTRACT

A resonant switching power converter having adaptive dead time control provides improved efficiency along with reduced EMI/audible noise and component stresses. A dead time between pulses generated by a switching circuit is adaptively set in conformity with a value of the input voltage to the resonant switching power converter and an indication of a magnitude of the current passing through inductive element of the resonant tank of the converter. The indication of the current magnitude may be the switching frequency of the converter, or a measure of line or load current levels. The dead time can be obtained from a look-up table or computed from the current magnitude and input voltage values.

20 Claims, 3 Drawing Sheets

(56) References Cited

U.S. PATENT DOCUMENTS

| | | |
|---|---|---|
| 4,697,210 A | 9/1987 | Toyota et al. |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A * | 6/1998 | Zaitsu .............. 363/15 |
| 5,781,040 A | 7/1998 | Myers |
| 5,783,909 A | 7/1998 | Hochstein |
| 5,798,635 A | 8/1998 | Hwang et al. |
| 5,834,858 A | 11/1998 | Crosman, III et al. |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A * | 8/1999 | Shimizu et al. ............ 363/65 |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang |
| 6,125,046 A | 9/2000 | Jang et al. |
| 6,150,774 A | 11/2000 | Mueller et al. |
| 6,166,926 A | 12/2000 | Nath et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,443,547 B1 | 9/2002 | Takahashi et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Anderson et al. |
| 6,753,661 B2 | 6/2004 | Muthu et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shytenberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,573 B2 | 1/2007 | Hershbarger |
| 7,158,633 B1 | 1/2007 | Hein |
| 7,161,816 B2 | 1/2007 | Shytenberg et al. |
| 7,180,250 B1 | 2/2007 | Gannon |
| 7,183,957 B1 | 2/2007 | Melanson |
| 7,212,640 B2 | 5/2007 | Bizjak |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,272,585 B2 | 9/2007 | Nomura et al. |
| 7,276,861 B1 | 10/2007 | Shteynberg et al. |
| 7,288,902 B1 | 10/2007 | Melanson |
| 7,289,054 B1 | 10/2007 | Watanabe |
| 7,292,013 B1 | 11/2007 | Chen et al. |
| 7,310,244 B2 | 12/2007 | Yang et al. |
| 7,331,226 B2 | 2/2008 | Feldman et al. |
| 7,345,458 B2 | 3/2008 | Kanal et al. |
| 7,375,476 B2 | 5/2008 | Walter et al. |
| 7,382,635 B2 | 6/2008 | Noda |
| 7,394,210 B2 | 7/2008 | Ashdown |

| | | |
|---|---|---|
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,656,103 B2 | 2/2010 | Shteynberg et al. |
| 7,667,986 B2 | 2/2010 | Artusi et al. |
| 7,710,047 B2 | 5/2010 | Shteynberg et al. |
| 7,719,246 B2 | 5/2010 | Melanson |
| 7,719,248 B1 | 5/2010 | Melanson |
| 7,733,669 B2 | 6/2010 | Jiao et al. |
| 7,746,043 B2 | 6/2010 | Melanson |
| 7,746,671 B2* | 6/2010 | Radecker et al. .......... 363/21.03 |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 7,872,883 B1* | 1/2011 | Elbanhawy .................... 363/25 |
| 7,894,216 B2 | 2/2011 | Melanson |
| 7,928,713 B2* | 4/2011 | Nguyen ........................ 323/282 |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2006/0285366 A1 | 12/2006 | Radecker et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0231009 A1 | 10/2007 | Watahiki |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0174479 A1 | 7/2009 | Yan et al. |
| 2009/0190384 A1 | 7/2009 | Thompson |
| 2009/0191837 A1 | 7/2009 | Nanda et al. |
| 2009/0207635 A1* | 8/2009 | Elferich .................... 363/21.03 |
| 2009/0218960 A1 | 9/2009 | Lyons et al. |
| 2010/0020570 A1 | 1/2010 | Melanson et al. |
| 2010/0020573 A1 | 1/2010 | Melanson et al. |
| 2010/0141317 A1 | 6/2010 | Szajnowski |

FOREIGN PATENT DOCUMENTS

| | | |
|---|---|---|
| EP | 0838791 | 4/1998 |
| EP | 1014563 | 6/2000 |
| EP | 1164819 | 12/2001 |
| EP | 1213823 | 6/2002 |
| EP | 1460775 | 9/2004 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| TW | 200812207 A | 3/2008 |
| TW | 200849778 A | 12/2008 |
| WO | WO 91/13417 | 9/1991 |
| WO | WO9725836 | 7/1997 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 0227944 | 4/2002 |
| WO | WO 02/091805 | 11/2002 |
| WO | WO2006013557 | 2/2006 |
| WO | WO 2006/067521 | 6/2006 |
| WO | WO 2006135584 | 12/2006 |
| WO | WO 2007/026170 | 3/2007 |
| WO | WO 2007/079362 | 7/2007 |
| WO | WO2008072160 | 6/2008 |
| WO | WO2008152838 | 12/2008 |

OTHER PUBLICATIONS

"HV9931 Unity Power Factor LED Lamp Driver, Initial Release", Supertex Inc., Sunnyvale, CA USA 2005.

A. Prodic, Compensator Design and Stability Assessment for Fast Voltage Loops of Power Factor Correction Rectifiers, IEEE Transactions on Power Electronics, vol. 22, No. 5, Sep. 2007.

A. R. Seidel et al., A Practical Comparison Among High-Power-Factor Electronic Ballasts with Similar Ideas, IEEE Transactions on Industry Applications, vol. 41, No. 6, Nov.-Dec. 2005.

A. Silva De Morais et al., A High Power Factor Ballast Using a Single Switch with Both Power Stages Integrated, IEEE Transactions on Power Electronics, vol. 21, No. 2, Mar. 2006.

AD7400 Datasheet, "Isolated Sigma-Delta Modulator", Analog Devices 2006.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Analog Devices, "120 kHz Bandwidth, Low Distortion, Isolation Amplifier", AD215, Norwood, MA, 1996.

Analog Devices, "Isolated Sigma-Delta Modulator", AD7400, Analog Devices, Norwood, MA, 2006.

Azoteq, IQS17 Family, IQ Switch®—ProxSense™ Series, Touch Sensor, Load Control and User Interface, IQS17 Datasheet V2.00. doc, Jan. 2007.

B.A. Miwa et al., High Efficiency Power Factor Correction Using Interleaved Techniques, Applied Power Electronics Conference and Exposition, Seventh Annual Conference Proceedings, Feb. 23-27, 1992.
BB3656 Datasheet "Transformer Coupled Isolation Amplifier", Burr-Brown 1987.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
Burr_Brown, "Transformer Coupled Isolation Amplifier", BB3656 Datasheet, Tucson, AZ, 1987.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
C. Dilouie, Introducing the LED Driver, EC&M, Sep. 2004.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.
Color Temperature, www.sizes.com/units/color_temperature.htm, printed Mar. 27, 2007.
D. Hausman, Lutron, RTISS-TE Operation, Real-Time Illumination Stability Systems for Trailing-Edge (Reverse Phase Control) Dimmers, v. 1.0 Dec. 2004.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
D. Maksimovic et al., "Switching Converters with Wide DC Conversion Range," Institute of Electrical and Electronic Engineer's (IEEE) Transactions on Power Electronics, Jan. 1991.
D. Rand et al., Issues, Models and Solutions for Triac Modulated Phase Dimming of LED Lamps, Power Electronics Specialists Conference, 2007.
D.K.W. Cheng et al., A New Improved Boost Converter with Ripple Free Input Current Using Coupled Inductors, Power Electronics and Variable Speed Drives, Sep. 21-23, 1998.
Dallas Semiconductor, Maxim, "Charge-Pump and Step-Up DC-DC Converter Solutions for Powering White LEDs in Series or Parallel Connections," Apr. 23, 2002.
Data Sheet LT3496 Triple Output LED Driver, Linear Technology Corporation, Milpitas, CA 2007.
Doyle et al., Feedback Control Theory, Macmillan Publishing Co., 1990.
Dunn, Jamie, "Determining MOSFET Driver Needs for Motor Drive Applications," AN898 Application Note, Microchip Technology, Chandler, AZ, 2003.
Dustin Rand et al: "Issues, Models and Solutions for Triac Modulated Phase Dimming of LED Lamps" Power Electronics Specialists Conferrence, 2007. PESC 2007. IEEE, IEEE, p. 1, Jun. 1, 2007, pp. 1398-1404.
Erickson, Robert W. et al, "Fundamentals of Power Electronics," Second Edition, Chapter 6, Boulder, CO, 2001.
F. T. Wakabayashi et al., An Improved Design Procedure for LCC Resonant Filter of Dimmable Electronic Ballast for Fluorescent Lamps, Based on Lamp Model, IEEE Transactions on Power Electronics, vol. 20, No. 2, Sep. 2005.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Fairchild Semiconductor, Application Note 42030, Theory and Application of the ML4821 Average Current Mode PFC Controller, Oct. 25, 2000.
Fairchild Semiconductor, Application Note 42030, Theory and Application of the ML4821 Average Current Mode PFC Controller, Aug. 1997.
Fairchild Semiconductor, Application Note 42047 Power Factor Correction (PFC) Basics, Rev. 0.9.0 Aug. 19, 2004.
Fairchild Semiconductor, Application Note 6004, 500W Power-Factor-Corrected (PFC) Converter Design with FAN4810, Rev. 1.0.1, Oct. 31, 2003.
Fairchild Semiconductor, Application Note AN4121, Design of Power Factor Correction Circuit Using FAN7527B, Rev.1.0.1, May 30, 2002.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVA Average Current PFC Controller, Rev. 1.0.1 Aug. 10, 2001.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, FAN7532, Ballast Controller, Rev. 1.0.2, Jun. 2006.
Fairchild Semiconductor, FAN7544, Simple Ballast Controller, Rev. 1.0.0, 2004.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
Fairchild Semiconductor, ML4812, Power Factor Controller, Rev. 1.0.4, May 31, 2001.
Fairchild Semiconductor, ML4821, Power Factor Controller, Jun. 19, 2001.
Fairchild Semiconductor, ML4821, Power Factor Controller, Rev. 1.0.2, Jun. 19, 2001.
Feng, et al. "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.
Freescale Semiconductor, AN1965, Design of Indirect Power Factor Correction Using 56F800/E, Jul. 2005.
Freescale Semiconductor, AN3052, Implementing PFC Average Current Mode Control Using the MC9S12E128, Nov. 2005.
Freescale Semiconductor, Inc., Dimmable Light Ballast with Power Factor Correction, Design Reference Manual, DRM067, Rev. 1, Dec. 2005.
G.Yao et al., Soft Switching Circuit for Interleaved Boost Converters, IEEE Transactions on Power Electronics, vol. 22, No. 1, Jan. 2007.
Gu, et al, "Three-Level LLC Series Resonant DC/DC Converter," IEEE Transactions on Power Electronics, vol. 20, No. 4, p. 781-789, Jul. 2005.
H. L. Cheng et al., A Novel Single-Stage High-Power-Factor Electronic Ballast with Symmetrical Topology, IEEE Transactions on Power Electronics, vol. 50, No. 4, Aug. 2003.
H. Peng et al., Modeling of Quantization Effects in Digitally Controlled DC-DC Converters, IEEE Transactions on Power Electronics, vol. 22, No. 1, Jan. 2007.
H. Wu et al., Single Phase Three-Level Power Factor Correction Circuit with Passive Lossless Snubber, IEEE Transactions on Power Electronics, vol. 17, No. 2, Mar. 2006.
Hirota, Atsushi et al, "Analysis of Single Switch Delta-Sigma Modulated Pulse Space Modulation PFC Converter Effectively Using Switching Power Device," IEEE, US, 2002.
Infineon, CCM-PFC Standalone Power Factor Correction (PFC) Controller in Continuous Conduction Mode (CCM), Version 2.1, Feb. 6, 2007.
International Rectifier, Application Note AN-1077,PFC Converter Design with IR1150 One Cycle Control IC, rev. 2.3, Jun. 2005.
International Rectifier, Data Sheet No. PD60230 revC, IR1150(S)(PbF), uPFC One Cycle Control PFC IC Feb. 5, 2007.
International Rectifier, Data Sheet PD60230 revC, Feb. 5, 2007.
International Rectifier, IRAC1150-300W Demo Board, User's Guide, Rev 3.0, Aug. 2, 2005.
Intersil, "Designing with the ISL6752, ISL6753 ZVS Full-Bridge Controllers," Application Note AN1262.0, Aug. 15, 2006.

J. A. Vilela Jr. et al., An Electronic Ballast with High Power Factor and Low Voltage Stress, IEEE Transactions on Industry Applications, vol. 41, No. 4, Jul./Aug. 2005.

J. Qian et al., Charge Pump Power-Factor-Correction Technologies Part II: Ballast Applications, IEEE Transactions on Power Electronics, vol. 15, No. 1, Jan. 2000.

J. Qian et al., New Charge Pump Power-Factor-Correction Electronic Ballast with a Wide Range of Line Input Voltage, IEEE Transactions on Power Electronics, vol. 14, No. 1, Jan. 1999.

J. Turchi, Four Key Steps to Design a Continuous Conduction Mode PFC Stage Using the NCP1653, ON Semiconductor, Publication Order No. AND184/D, Nov. 2004.

J. Zhou et al., Novel Sampling Algorithm for DSP Controlled 2 kW PFC Converter, IEEE Transactions on Power Electronics, vol. 16, No. 2, Mar. 2001.

J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K.M. Smedley, One-Cycle Control of Switching Converters, IEEE Transactions on Power Electronics, vol. 10, No. 6, Nov. 1995.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

L. Gonthier et al., EN55015 Compliant 500W Dimmer with Low-Losses Symmetrical Switches, 2005 European Conference on Power Electronics and Applications, Sep. 2005.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Linear Technology, "Single Switch PWM Controller with Auxiliary Boost Converter," LT1950 Datasheet, Linear Technology, Inc., Milpitas, CA, 2003.

Linear Technology LTC3705 Datasheet, 2005 Linear Technology, Inc.

Linear Technology, 100 Watt LED Driver, Linear Technology, 2006.

Linear Technology, LT1248, Power Factor Controller, Apr. 20, 2007.

Linear Technology, News Release,Triple Output LED, LT3496, Linear Technology, Milpitas, CA, May 24, 2007.

Linear Technology,"2-Switch Forward Controller and Gate Driver," LTC3705 Datasheet, Linear Technology, Inc. Milpitas, CA, 2005.

Lu et al., International Rectifier, Bridgeless PFC Implementation Using One Cycle Control Technique, 2005.

Lu, et al, "Quasi Current Mode Control for the Phase-Shifted Series Resonant Converter," IEEE Transactions on Power Electronics, vol. 23, No. 1, p. 353-358, Jan. 2008.

M. Brkovic et al., "Automatic Current Shaper with Fast Output Regulation and Soft-Switching," S.15.C Power Converters, Telecommunications Energy Conference, 1993.

M. K. Kazimierczuk et al., Electronic Ballast for Fluorescent Lamps, IEEETransactions on Power Electronics, vol. 8, No. 4, Oct. 1993.

M. Madigan et al., Integrated High-Quality Rectifier-Regulators, IEEE Transactions on Industrial Electronics, vol. 46, No. 4, Aug. 1999.

M. Ponce et al., High-Efficient Integrated Electronic Ballast for Compact Fluorescent Lamps, IEEE Transactions on Power Electronics, vol. 21, No. 2, Mar. 2006.

M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades et al., Low Cost Electronic Ballast for a 36-W Fluorescent Lamp Based on a Current-Mode-Controlled Boost Inverter for a 120-VDC Bus Power Distribution, IEEE Transactions on Power Electronics, vol. 21, No. 4, Jul. 2006.

Mammano, B., Resonant Mode Converter Topologies, Texas Instruments, 2001.

Megaman, D or S Dimming ESL, Product News, Mar. 15, 2007.

National Lighting Product Information Program, Specifier Reports, "Dimming Electronic Ballasts," vol. 7, No. 3, Oct. 1999.

Noon, Jim "UC3855A/B High Performance Power Factor Preregulator", Texas Instruments, SLUA146A, May 1996,Revised Apr. 2004.

NXP, TEA1750, GreenChip III SMPS control IC Product Data Sheet, Apr. 6, 2007.

O. Garcia et al., High Efficiency PFC Converter to Meet EN61000-3-2 and A14, Proceedings of the 2002 IEEE International Symposium on Industrial Electronics, vol. 3, 2002.

ON Semconductor, NCP1606, Cost Effective Power Factor Controller, Mar. 2007.

ON Semiconductor, AND8123/D, Power Factor Correction Stages Operating in Critical Conduction Mode, Sep. 2003.

ON Semiconductor, MC33260, GreenLine Compact Power Factor Controller: Innovative Circuit for Cost Effective Solutions, Sep. 2005.

ON Semiconductor, NCP1605, Enhanced, High Voltage and Efficient Standby Mode, Power Factor Controller, Feb. 2007.

ON Semiconductor, NCP1654, Product Review, Power Factor Controller for Compact and Robust, Continuous Conduction Mode Pre-Converters, Mar. 2007.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

P. Lee et al., Steady-State Analysis of an Interleaved Boost Converter with Coupled Inductors, IEEE Transactions on Industrial Electronics, vol. 47, No. 4, Aug. 2000.

Philips, Application Note, 90W Resonant SMPS with TEA1610 SwingChip, AN99011, 1999.

Power Integrations, Inc., "TOP200-4/14 TOPSwitch Family Three-terminal Off-line PWM Switch", XP-002524650, Jul. 1996, Sunnyvale, California.

Power Supply Design Tutorial, SMPS Block Diagram, Basic Concepts, Theory of Operation, http://www.smps.us/power-supply.html, printed Aug. 11, 2008.

Prodic, A. et al, "Dead Zone Digital Controller for Improved Dynamic Response of Power Factor Preregulators," IEEE, 2003.

Prodic, Aleksandar, "Digital Controller for High-Frequency Rectifiers with Power Factor Correction Suitable for On-Chip Implementation," IEEE, US, 2007.

Q. Li et al., An Analysis of the ZVS Two-Inductor Boost Converter under Variable Frequency Operation, IEEE Transactions on Power Electronics, vol. 22, No. 1, Jan. 2007.

Renesas Technology Releases Industry's First Critical-Conduction-Mode Power Factor Correction Control IC Implementing Interleaved Operation, Dec. 18, 2006.

Renesas, Application Note R2A20111 EVB, PFC Control IC R2A20111 Evaluation Board, Feb. 2007.

Renesas, HA16174P/FP, Power Factor Correction Controller IC, Jan. 6, 2006.

S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.

S. Chan et al., Design and Implementation of Dimmable Electronic Ballast Based on Integrated Inductor, IEEE Transactions on Power Electronics, vol. 22, No. 1, Jan. 2007.

S. Dunlap et al., Design of Delta-Sigma Modulated Switching Power Supply, Circuits & Systems, Proceedings of the 1998 IEEE International Symposium, 1998.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

S. Lee et al., TRIAC Dimmable Ballast with Power Equalization, IEEE Transactions on Power Electronics, vol. 20, No. 6, Nov. 2005.

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.
ST Microelectronics, AN993, Application Note, Electronic Ballast with PFC Using L6574 and L6561, May 2004.
ST Microelectronics, L6574, CFL/TL Ballast Driver Preheat and Dimming, Sep. 2003.
ST Microelectronics, Power Factor Corrector L6561, Jun. 2004.
STMicroelectronics, L6563, Advanced Transition-Mode PFC Controller, Mar. 2007.
Supertex Inc., 56W Off-line LED Driver, 120VAC with PFC, 160V, 350mA Load, Dimmer Switch Compatible, DN-H05, Feb. 2007.
Supertex Inc., Buck-based LED Drivers Using the HV9910B, Application Note AN-H48, Dec. 28, 2007.
Supertex Inc., HV9931 Unity Power Factor LED Lamp Driver, Application Note AN-H52, Mar. 7, 2007.
T. Wu et al., Single-Stage Electronic Ballast with Dimming Feature and Unity Power Factor, IEEE Transactions on Power Electronics, vol. 13, No. 3, May 1998.
Texas Instruments, "BiCMOS Advanced Phase-Shift PWM Controller Datasheet," UCC1895, UCC2895, UCC3895, Dec. 1999, Rev. Apr. 2008.
Texas Instruments, Application Note SLUA321, Startup Current Transient of the Leading Edge Triggered PFC Controllers, Jul. 2004.
Texas Instruments, Application Report SLUA308, UCC3817 Current Sense Transformer Evaluation, Feb. 2004.
Texas Instruments, Application Report SLUA369B, 350-W, Two-Phase Interleaved PFC Pre-Regulator Design Review, Mar. 2007.
Texas Instruments, Application Report SPRA902A, Average Current Mode Controlled Power Factor Correctiom Converter using TMS320LF2407A, Jul. 2005.
Texas Instruments, Application Report, SLUA309A, Avoiding Audible Noise at Light Loads when using Leading Edge Triggered PFC Converters, Sep. 2004.
Texas Instruments, SLOS318F, "High-Speed, Low Noise, Fully-Differential I/O Amplifiers," THS4130 and THS4131, US, Jan. 2006.
Texas Instruments, SLUS828B, "8-Pin Continuous Conduction Mode (CCM) PFC Controller", UCC28019A, US, revised Apr. 2009.
Texas Instruments, Transition Mode PFC Controller, SLUS515D, Jul. 2005.
Texas Instruments, UCC3817 BiCMOS Power Factor Preregulator Evaluation Board User's Guide, Nov. 2002.
Unitrode Products From Texas Instruments, BiCMOS Power Factor Preregulator, Feb. 2006.
Unitrode Products From Texas Instruments, High Performance Power Factor Preregulator, Oct. 2005.
Unitrode Products From Texas Instruments, Programmable Output Power Factor Preregulator, Dec. 2004.
Unitrode, Design Note DN-39E, Optimizing Performance in UC3854 Power Factor Correction Applications, Nov. 1994.
Unitrode, High Power-Factor Preregulator, Oct. 1994.
Unitrode, L. Balogh, Design Note UC3854A/B and UC3855A/B Provide Power Limiting with Sinusoidal Input Current for PFC Front Ends, SLUA196A, Nov. 2001.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
W. Zhang et al., A New Duty Cycle Control Strategy for Power Factor Correction and FPGA Implementation, IEEE Transactions on Power Electronics, vol. 21, No. 6, Nov. 2006.
Why Different Dimming Ranges? The Difference Between Measured and Perceived Light, 2000 http://www.lutron.com/ballast/pdf/LutronBallastpg3.pdf.
Wong, et al., "Steady-state Analysis of Hysteretic Control Buck Converters", Power Electronics and Motion Control Conference, IEEE Press, New Jersey, Sep. 2008.
Y. Ji et al., Compatibility Testing of Fluorescent Lamp and Ballast Systems, IEEE Transactions on Industry Applications, vol. 35, No. 6, Nov./Dec. 1999.
Y. Ohno, Spectral Design Considerations for White LED Color Rendering, Final Manuscript, Optical Engineering, vol. 44, 111302 (2005).
Z. Lai et al., A Family of Power-Factor-Correction Controllers, Twelfth Annual Applied Power Electronics Conference and Exposition, vol. 1, Feb. 23, 1997-Feb. 27, 1997.
Zhao, et al. "Steady-state and Dynamic Analysis of a Buck Converter Using a Hysteretic PWM Control", Power Electronics Specialists Conference, IEEE Press, New Jersey, Jun. 2004.
Zie, et al, "Analysis and Optimization of LLC Resonant Converter with a Novel Over-Current Protection Circuit," IEEE Transactions on Power Electronics, vol. 22, No. 2, p. 435-443, Mar. 2007.
Maksimovic, et al., "Impact of Digital Control in Power Electronics", Proceedings of the 2004 International Symposium on Power Semiconductor Devices & ICs, pp. 13-22, Kitakyushu, JP, 2004.
L6562 Datasheet, "Transition-Mode PFC Controller", ST Microelectronics, Nov. 2005, Geneva, Switzerland.
Mamano, Bob, "Current Sensing Solutions for Power Supply Designers", Unitrode Seminar Notes SEM1200, 1999.
Texas Instruments, Interleaving Continuous Conduction Mode PFC Controller, UCC28070, SLUS794C, Nov. 2007, revised Jun. 2009, Texas Instruments, Dallas TX.
http://toolbarpdf.com/docs/functions-and-features-of-inverters.html printed on Jan. 20, 2011.
Vishwanathan, et al., "High Voltage DC Power Supply Topology for Pulsed Load Applications with Converter Switching Synchronized to Load Pulses", vol. 1, Nov. 2003.
Intersil, AN1262.0, "Designing with the ISL6752, ISL6753 ZVS Full-Bridge Controllers", Aug. 2006.
Hattrup et al., "Fast Estimation Techniques for Digital Control of Resonant Converters", IEEE Transactions on Power Electronics, Jan. 2003, p. 365-372, vol. 18, No. 1.
Foster et al., "Cyclic-Averaging for High Speed Analysis of Resonant Converters", IEEE Transactions on Power Electronics, Jul. 2003, p. 985-993, vol. 18, No. 4.
Mangat et al., "A Modified Asymmetrical Pulse-Width-Modulated Resonant DC/DC Converter Topology", IEEE Transactions on Power Electronics, Jan. 2004, p. 104-111, vol. 19, No. 1.
Tuomainen et al., "Effect of Resonant Transition on Efficiency of Forward Converter with Active Clamp and Self-Driven SRs", IEEE Transactions on Power Electronics, Mar. 2005, p. 315-323, vol. 20, No. 2.
Lilei Gu et al., "Three-Level LLC Series Resonant DC/DC Converter", IEEE Transactions on Power Electronics, Jul. 2005, p. 781-789, vol. 20, No. 4.
Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.
Chen et al., "Generalized Optimal Trajectory Control for Closed Loop Control of Series-Parallel Resonant Converter", IEEE Transactions on Power Electronics, Sep. 2006, p. 1347-1355, vol. 21, No. 5.
Lin et al., "Robust Controller Design for a Series Resonant Converter via Duty-Cycle Control", IEEE Transactions on Power Electronics, Sep. 1999, p. 793-802, vol. 14 No. 5.
Laouamri et al., "Modeling and Analysis of Wound Integrated LCT Structure for Single Stage Resonant PFC Rectifier", IEEE Transactions on Power Electronics, Jan. 2003, p. 256-269, vol. 18, No. 1.
Xie et al., "Analysis and Optimization of LLC Resonant Converter With a Novel Over-Current Protection Circuit", IEEE Transactions on Power Electronics, Mar. 2007, p. 435-443, vol. 22 No. 2.
Bhat et al., "Analysis and Design of a High-Frequency Resonant Converter Using *LCC*-Type Commutation", IEEE Transactions on Power Electronics, Oct. 1987, p. 291-301, vol. PE-2 No. 4.

De Groot et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.

Abramovitz et al., "A Resonant DC-DC Transformer With Zero Current Ripple", IEEE Transactions on Power Electronics, Nov. 2007, p. 2344-2351, vol. 22, No. 6.

Ye et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.

Yan Lu et al., "Quasi Current Mode Control for the Phase-Shifting Series Resonant Converter", IEEE Transactions on Power Electronics, Jan. 2008, p. 353-358, vol. 23 No. 1.

Texas Instruments BiCMOS Advanced Phase-Shift PWM Controller Datasheet, Dec. 1999, Rev. Apr. 2008.

* cited by examiner

RESONANT SWITCHING POWER CONVERTER WITH ADAPTIVE DEAD TIME CONTROL

This application Claims priority under 35 U.S.C. §119(e) to U.S. Provisional Patent Application Ser. No. 61/083,717 filed on Jul. 25, 2008.

BACKGROUND OF THE INVENTION

1. Field of the Invention

The present invention relates generally to switching power regulator circuits, and more specifically, to a resonant switching power converter in which dead time between pulses is adaptively controlled.

2. Background of the Invention

In resonant switching power converters, to avoid introducing losses and stresses in the switching circuit, it is desirable to switch the transistors in the switching circuit when the voltage difference across the source and drain is at a minimum. Since any potential present across a switching transistor and any drain-source connected capacitor at the time of the transistor's activation will result in a waste of energy, zero-voltage switching (ZVS) control is desirable. If the switching circuit switches too early, the transistor and capacitors will be discharged through the switching circuit, wasting energy. However, if the switching circuit is switched too late, energy can be wasted by currents conducted through the body diodes of the transistors back to the power supply rail. ZVS control raises the efficiency of the power supply and also reduces the stresses experienced by the switching transistor, increasing reliability. Further, transients generated at the switching frequency can cause electromagnetic interference (EMI) and audible noise, as the switching frequency of such resonant converters is typically within the audio range.

In order to provide ZVS control, the dead time between pulses may be set to a time duration such that the input to the resonant tank has swung from near one power supply rail to the other power supply rail (for bipolar pulses), or has completed a full cycle (for unipolar pulses). However, since the frequency of the resonant converter is varied in order to control the inductor current and thus the energy supplied to the load, the time duration corresponding to the dead time will not be correct for all operating conditions. Typically the dead time is set to favor the higher power operating condition (i.e., the higher frequency operating condition), since losses due to non-optimum switching times are greater for higher inductor current levels.

Therefore, it would be desirable to provide a resonant switching power converter having improved efficiency, reduced stresses and audio/EMI noise.

SUMMARY OF THE INVENTION

The above stated objectives of providing a resonant switching power converter having improved efficiency, reduced stresses and reduced EMI and audible noise is achieved in a resonant switching power converter and its method of operation.

The resonant switching power converter includes a resonant tank circuit, a switching circuit for transferring energy to the resonant tank circuit from an input voltage source, and a transformer for coupling the resonant tank circuit to an output of the switching power converter. A dead time between pulses generated by the switching circuit is adaptively set, by a control circuit, in conformity with the voltage of the input voltage and an indication of an inductor current passing through the inductive element of the resonant tank circuit.

The indication of the inductor current may be the switching frequency, a direct or indirect measurement of the current through the inductive element, or another related value such as output load current or an input line current of the power supply. The control circuit may compute the dead time on a cycle-by-cycle basis from the indication of the current, or use a look-up table that sets the dead time in conformity with the input voltage and inductor current values.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods that adaptively control the dead-time between pulses in a resonant switching power converter in order to raise the efficiency of the converter and reduce stresses and audible/EMI noise. The dead-time is controlled in conformity with a value of the input voltage to the converter and an indication of the magnitude of the current flowing through an inductance of the resonant tank used within the resonant switching power converter.

Figure 1:
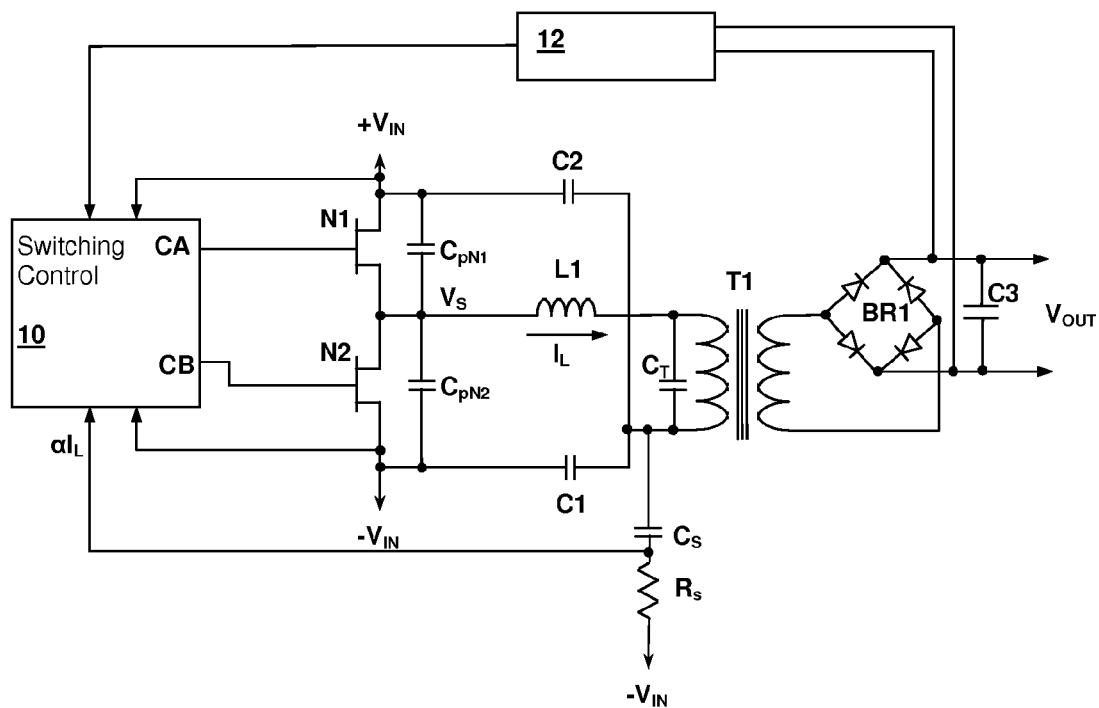
FIG. 1 is a simplified schematic diagram depicting a resonant switching power converter in accordance with an embodiment of the present invention.

Referring now to FIG. 1, a resonant switching power converter circuit in accordance with an embodiment of the present invention is shown. A switching control circuit 10 controls a switching circuit implemented by transistors N1 and N2. A series-resonant tank circuit formed by an inductance and a capacitance and is energized by the switching action of transistors N1 and N2. A transformer T1 couples energy from the resonance tank circuit to a rectifier bridge BR1 which provides rectified current for charging output capacitor C3. Output voltage $V_{OUT}$ may be maintained at a predetermined voltage during operation by a feedback circuit 12 that provides a feedback signal to switching control circuit 10. Alternatively, operation may be open-loop with respect to output voltage $V_{OUT}$, which is an especially applicable design if the load impedance across the output is not expected to vary substantially. Switching control circuit 10 may be an integrated circuit integrated on a single die, and may include other elements depicted within the circuit of FIG. 1, for example, switching transistors N1 and N2 and/or feedback circuit 12.

In FIG. 1, the inductance of the resonant tank circuit is illustrated as an inductor L1 plus any leakage inductance of the primary winding of transformer T1. However, it is understood that the inductance of the resonant tank circuit may be entirely supplied by the leakage inductance of transformer T1 and therefore inductor L1 will not be present in some embodiments of the invention. The capacitance of the resonant tank circuit is supplied by the total series capacitance of the tank, which as illustrated includes the parallel combination of capacitors C1 and C2, the parasitic winding capacitance $C_T$ in parallel with any reflected capacitance at the primary winding of transformer T1, and when neither transistor N1 nor N2 is active, the parallel combination of the parasitic capacitances ($C_{pN1}$, and $C_{pN2}$) of transistors N1 and N2.

Switching control circuit 10 adaptively controls a dead-time between the pulses that are generated by turning on transistors N1 and N2, which are activated in alternation to provide alternating pulses of opposite polarity, sourced by one of corresponding power supply voltages $+V_{IN}$ or $-V_{IN}$ to the resonant tank circuit formed by inductor L1 and capacitors C1-C2. If dead-time is not provided between the pulses, when one of transistors N1 and N2 is activated, the charge on the corresponding one of parasitic capacitances $C_{pN1}$ and $C_{pN2}$ would be discharged. Similarly, the other one of parasitic capacitances $C_{pN1}$ and $C_{pN2}$ would be suddenly charged to approximately the full input voltage. The charge placed on and removed from parasitic capacitances $C_{pN1}$ and $C_{pN2}$ when dead-time is not provided represents wasted energy and reduces the efficiency of the resonant converter. Further, the high levels of current required to charge and discharge parasitic capacitances $C_{pN1}$ and $C_{pN2}$ raises stress levels in transistors N1 and N2 and can cause EMI and/or audible noise. By providing a dead-time such that voltage $V_S$ swings to a voltage near the opposite power supply rail after a pulse has terminated, when the next pulse occurs and activates one of transistors N1 or N2, the voltage discharged from the corresponding parasitic capacitor will be much smaller, raising the efficiency of the resonant power converter. Such operation is generally known as zero-voltage switching (ZVS), and as mentioned above, the dead-time is generally set to provide ZVS operation near the highest frequency of operation of the resonant switching power converter, as losses are larger at the higher frequency. (A greater number of transitions occur per unit time interval, and therefore, a greater waste of energy occurs.)

In the present invention, the dead-time between pulses is adaptively controlled. In particular, in digital implementations of a resonant power converter in accordance with an embodiment of the present invention, the timing of pulses is generally determined by counters, and any dead-time provided is also generated from a count value and is set in conformity with a value of the input voltage and an indication of the magnitude of the inductor current $I_L$ flowing through inductor L1, so that an appropriate dead-time is maintained to provide ZVS operation, or alternatively, operation in which the voltage remaining on the parasitic capacitance of the transistor being activated is substantially reduced from the full power supply voltage range.

The indication of the magnitude of inductor current $I_L$ can be obtained from a number of sources, including a measurement circuit that directly measures the inductor current, an example of which is provided by capacitor $C_S$ and resistor $R_S$ in the depicted embodiment. Since the return current at the node connecting transformer T1 to capacitor $C_S$ is split between capacitors C1, C2 and $C_S$, if a relatively small value of capacitance is used for capacitor $C_S$, a small portion of inductor current $I_L$ will be passed through capacitor $C_S$ and generate a voltage drop proportional to inductor current $I_L$ across resistor $R_S$. The voltage across resistor $R_S$ can then be used as a direct indication $\alpha I_L$ of inductor current $I_L$ without significantly affecting the performance of resonant switching power converter. Resistor $R_S$ can be incorporated within an integrated circuit that includes switching control circuit 10 and be internally connected to power supply voltage $-V_{IN}$. In such an implementation, capacitor $C_S$ is connected to a pin of the integrated circuit, which thereby directly receives the portion of inductor current $I_L$ that passes through capacitor $C_S$ and that serves as an indication of the magnitude inductor current $I_L$.

In addition to, or as an alternative to, the inductor current measurements described above, the indication of the magnitude of inductor current $I_L$ may be the frequency of operation of the resonant converter, since inductor current $I_L$ is generally proportional to the frequency of operation. For digitally-controlled converters, the frequency of operation is generally already specified in some digital form within switching control 10, since a divider or other mechanism is used to generate the switching frequency that will ultimately generate control signals CA and CB, which control the gate terminals of transistors N1 and N2. Also, in current mode resonant converters, an indication of the output current magnitude is provided from feedback circuit 12 and used to control the switching frequency of the resonant switching power converter and is therefore also proportional to inductor current $I_L$. In voltage mode resonant converters, a current load current sensing circuit may be included for providing the indication of magnitude of the inductor current, and may be present for other purposes, such as over-current protection. Finally, the inductor current could be sensed directly with a series sense resistor, or a secondary inductor winding provided to a circuit that integrates the voltage across the inductor winding, such as an analog low-pass filter.

Since the frequency of operation is adjusted with line and load conditions in order to maintain a particular output voltage or current level, the line voltage is also generally known in some form at switching control 10. Therefore, using frequency and voltage information available within switching control, the dead-time can be set to different values that provide ZVS operation over the full range of frequencies and load/line conditions at which the resonant switching power converter of FIG. 1 operates.

Figure 2A:
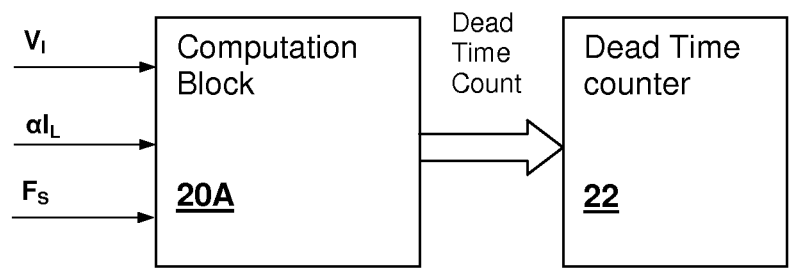
FIG. 2A and FIG. 2B are block diagrams depicting dead-time control circuits that may be used within switching control 10 of FIG. 1, in accordance with embodiments of the invention.

Referring now to FIG. 2A, an adaptive dead-time control circuit that may be used within switching control 10 of FIG. 1 is shown, in accordance with an embodiment of the invention. A computation block 20A receives at least an input voltage value $V_I$ and some indication of the magnitude of the current flowing through inductor L1, which may be switching frequency $F_S$, inductor current indication $\alpha I_L$ as measured, or both. Computation block 20A computes an output value Dead Time Count from the input values, which is then used to set a dead time counter 22 that determines the time between the trailing edge of a last pulse and the leading edge of the next pulse. Computation block 20A may be a processing element that computes output value Dead Time Count from input voltage value $V_I$ and the indication of inductor current provided by frequency $F_S$ and/or inductor current indication $\alpha I_L$, or a dedicated digital circuit may be provided as computation block 20A.

Figure 2B:
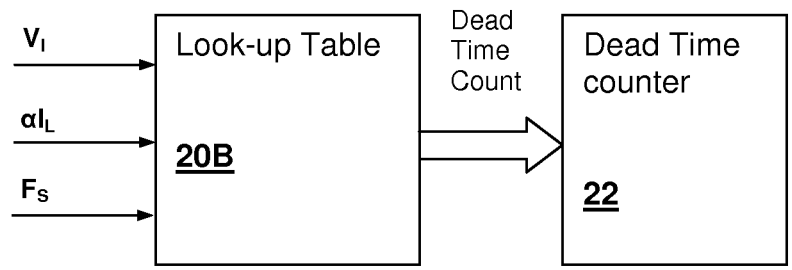

Referring now to FIG. 2B, an adaptive dead-time control circuit that may be used within switching control 10 of FIG. 1 is shown, in accordance with another embodiment of the invention. A look-up table 20B is addressed by at least an input voltage value $V_I$ and some indication of the magnitude of the current flowing through inductor L1, which may be switching frequency $F_S$, inductor current indication $\alpha I_L$ as measured, or both. Look-up table 20B provides an output value Dead Time Count as selected by the input values, which is then used to set dead time counter 22.

Figure 3:
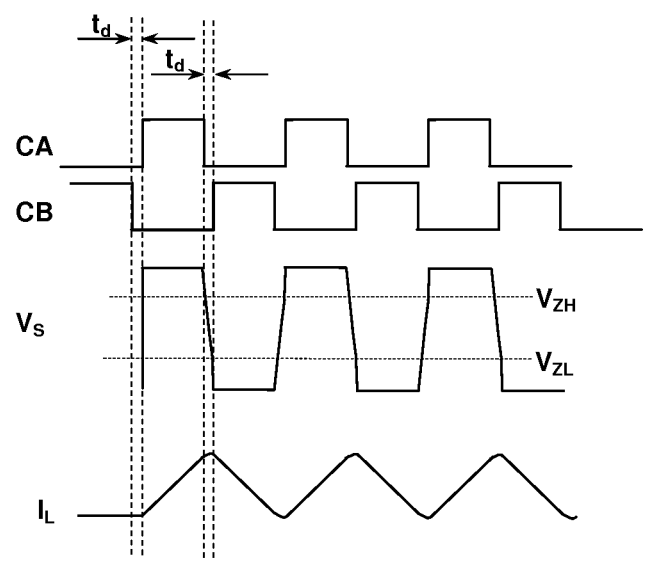
FIG. 3 is a timing diagram depicting operation of the switching power converter of FIG. 1.

Referring now to FIG. 3, operation of the resonant switching power converter of FIG. 1 is illustrated. Between the active (high) states of control signals CA and CB, a variable dead-time $t_d$ is provided, as determined in conformity with input voltage $V_I$ and the indication of inductor current magnitude. Voltage $V_S$ transitions during the dead-times, to voltage $V_{ZL}$ or voltage $V_{ZH}$, depending on the polarity of inductor current $I_L$. (When no switching transistor is active, inductor current $I_L$ discharges the capacitance across the transistor that was previously charging the inductor, as can be observed in the continued trend of inductor current $I_L$ during the dead-time.) Voltage $V_{ZL}$ or voltage $V_{ZH}$ are shown apart from the power supply rails for clarity of illustration, and as illustrated at approximately 25% of the power supply rail, can result in efficiency improvement on the order of 16:1 with respect to the energy wasted in charging and discharging parasitic capacitances $C_{pN1}$ and $C_{pN2}$. However, the voltage at the end of the dead time can be set to exactly a zero voltage difference from the next power supply rail that will be applied to the resonant tank, so that no discharging of parasitic capacitances $C_{pN1}$ and $C_{pN2}$ occurs at all. Further, because voltage $V_S$ will not exceed the power supply rails during the dead-time, but reverses direction at some point due to a start of oscillation in the resonant tank, the dead time can be set by the control circuit to a point anywhere in the vicinity of, either before or after, the reversal of voltage $V_S$ due to the start of oscillation.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A resonant switching power circuit, comprising:
   a resonant circuit including at least one inductance and at least one capacitance for transferring energy to an output of the resonant switching power circuit;
   a switching circuit coupled to the resonant circuit for transferring energy from an input voltage source to the resonant circuit, wherein the switching circuit includes a first transistor for selectively coupling the resonant circuit to an output node of the input voltage source and a second transistor for selectively coupling the resonant circuit to a return node of the input voltage source; and
   a control circuit for controlling the switching circuit such that a dead time between de-activation of one of the first transistor or the second transistor and activation of a second one of the first transistor or the second transistor is dynamically set in dependence on an indication of a magnitude of a current flowing through the inductance and a value of a voltage of the input voltage source.

2. The resonant switching power circuit of claim 1, wherein the indication of the magnitude of the current flowing through the inductance is a switching frequency at which the switching circuit is operated.

3. The resonant switching power circuit of claim 1, further comprising a current measurement circuit for measuring the current flowing through the inductance and wherein the indication of the magnitude of the current flowing through the inductance is obtained from an output of the current measurement circuit.

4. The resonant switching power circuit of claim 3, wherein the current measurement circuit comprises:
   a sensing capacitor coupled in parallel with a capacitance of the resonant tank circuit; and
   a sensing resistor coupled in series with the sensing capacitor, whereby a voltage drop across the sensing resistor provides the indication of the magnitude of the inductor current.

5. The resonant switching power circuit of claim 1, wherein the indication of the magnitude of the current flowing through the inductance is a load current measured at the output of the resonant switching power circuit.

6. The resonant switching power circuit of claim 1, wherein the control circuit comprises a look-up table from which a dead time value is retrieved in conformity with the indication of the magnitude of the current flowing through the inductance and the value of the voltage of the input voltage source, and wherein the control circuit controls the switching times of the first and second transistor in conformity with the dead time value.

7. The resonant switching power circuit of claim 1, wherein the control circuit comprises a circuit that computes a dead time value in conformity with the indication of the magnitude of the current flowing through the inductance and the value of the voltage of the input voltage source, and wherein the control circuit controls the switching times of the first and second transistor in conformity with the dead time value.

8. A method of controlling switching in a resonant switching power circuit, the method comprising:
   transferring energy to an output of the resonant switching power circuit from a resonant tank circuit;
   transferring energy from an input voltage source to the resonant circuit by operating a switching circuit; and
   controlling a dead-time between pulses of the switching circuit in conformity with a voltage of the input voltage source and an indication of a magnitude of a current flowing through an inductance of the resonant tank circuit.

9. The method of claim 8, wherein the indication of the magnitude of the current flowing through the inductance is a switching frequency at which the switching circuit is operated.

10. The method of claim 8, further comprising measuring a current flowing through the inductance and wherein the indication of the magnitude of the current flowing through the inductance is obtained from a result of the measuring.

11. The method of claim 10, wherein the measuring comprises:
    passing a portion of the current flowing through a capacitance of the resonant tank circuit through a sensing capacitor; and
    measuring a voltage drop across a sensing resistor coupled in series with the sensing capacitor to provide the indication of the magnitude of the inductor current.

12. The method of claim 8, further comprising measuring a value of a load current at the output of the resonant switching power circuit, wherein the indication of the magnitude of the current flowing through the inductance is determined from the value of the load current.

13. The method of claim 8, wherein the controlling the dead-time comprises retrieving a dead-time value from a look-up table in conformity with the indication of the magnitude of the current flowing through the inductance and the value of the voltage of the input voltage source, and wherein the controlling sets the dead-time between the pulses in conformity with the dead time value.

14. The method of claim 8, further comprising computing a dead time value in conformity with the indication of the magnitude of the current flowing through the inductance and the value of the voltage of the input voltage source, and wherein the controlling sets the dead-time between the pulses in conformity with the dead time value.

15. An integrated circuit controller, integrated on a single die, for controlling a resonant switching power converter, wherein the integrated circuit controller provides control signals to a switching circuit that generates pulses provided to an input of a resonant tank circuit that transfers power to a load from an input voltage source, and wherein the controller includes a control circuit for controlling a dead-time between the pulses in conformity with a voltage of the input voltage source and an indication of a magnitude of a current flowing through an inductance of the resonant tank circuit.

16. The integrated circuit controller of claim 15, wherein the indication of the magnitude of the current flowing through the inductance is a switching frequency at which the switching circuit is operated.

17. The integrated circuit controller of claim 15, further comprising an input for receiving a voltage or current indicative of the current flowing through the inductance and wherein the indication of the magnitude of the current flowing through the inductance is obtained from the input.

18. The integrated circuit controller of claim 15, further comprising an input for receiving a voltage or current indicative of a load current provided to the load, and wherein the indication of the magnitude of the current flowing through the inductance is obtained from the input.

19. The integrated circuit controller of claim 15, wherein the control circuit comprises a look-up table from which a dead time value is retrieved in conformity with the indication of the magnitude of the current flowing through the inductance and the value of the voltage of the input voltage source, and wherein the control circuit controls the switching times of the first and second transistor in conformity with the dead time value.

20. The integrated circuit controller of claim 15, wherein the control circuit comprises a circuit that computes a dead time value in conformity with the indication of the magnitude of the current flowing through the inductance and the value of the voltage of the input voltage source, and wherein the control circuit controls the switching times of the first and second transistor in conformity with the dead time value.

* * * * *